(No Model.)  C. W. ROBINSON.  2 Sheets—Sheet 1.
WAGON.

No. 501,165.  Patented July 11, 1893.

WITNESSES

INVENTOR
Charles W. Robinson
By J. B. Sawyer,
his Atty.

(No Model.)
C. W. ROBINSON.
WAGON.
No. 501,165.　　　　　　　　Patented July 11, 1893.
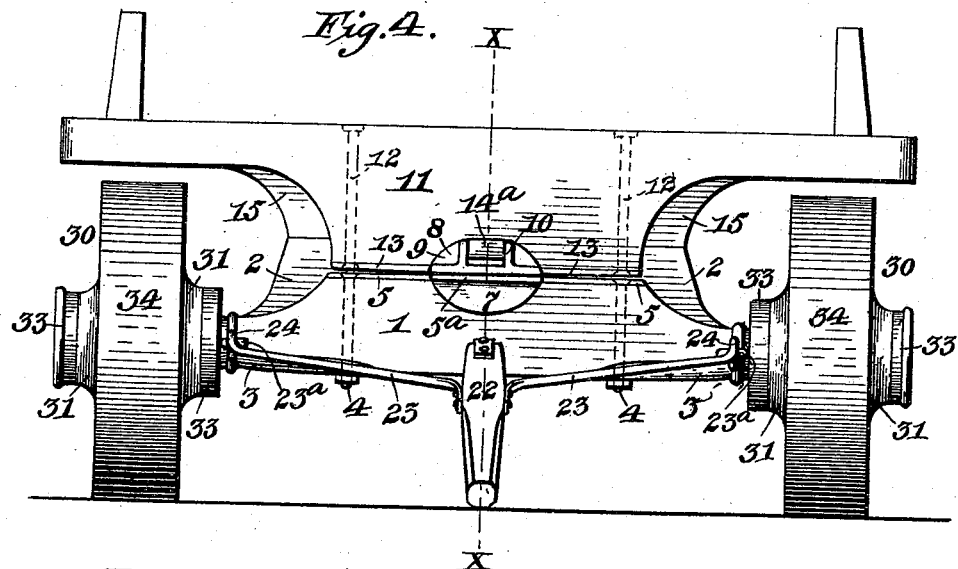
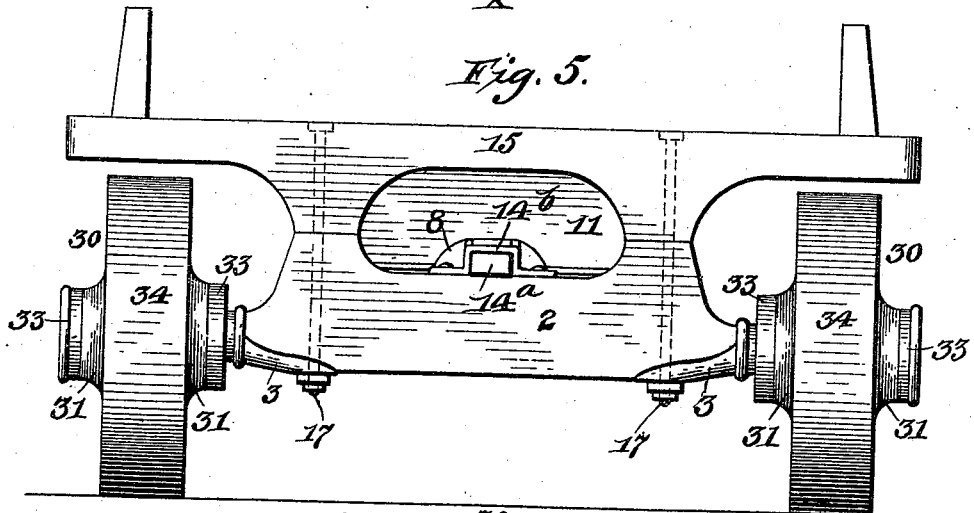
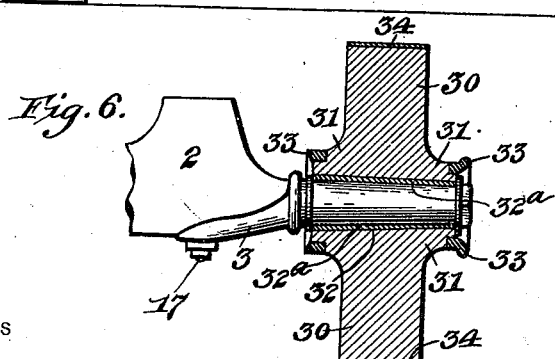
WITNESSES
INVENTOR
Charles W. Robinson,
By J. B. Sawyer,
his atty.

UNITED STATES PATENT OFFICE.

CHARLES W. ROBINSON, OF REED CITY, MICHIGAN.

WAGON.

SPECIFICATION forming part of Letters Patent No. 501,165, dated July 11, 1893.

Application filed March 7, 1893. Serial No. 464,956. (No model.)

*To all whom it may concern:*

Be it known that I, CHARLES W. ROBINSON, a citizen of the United States, residing at Reed City, in the county of Osceola and State of Michigan, have invented certain new and useful Improvements in the Construction of Wagons; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain new and useful improvements in the construction of wagons, and it especially consists in a new and improved means of connecting the pole to the forward axle thereof, whereby the strain is directly communicated to the king-bolt, and to certain new and useful improvements in fifth wheels therefor, which from its peculiar shape is adapted to receive and support the forward end of the reach and the bolster.

My invention also consists in the details of construction and the arrangement and combination of the several parts of which the wagon is composed, whereby a device is made which is cheap and simple in construction and efficient and convenient in use, as will be hereinafter more fully described and claimed.

Figure 3:
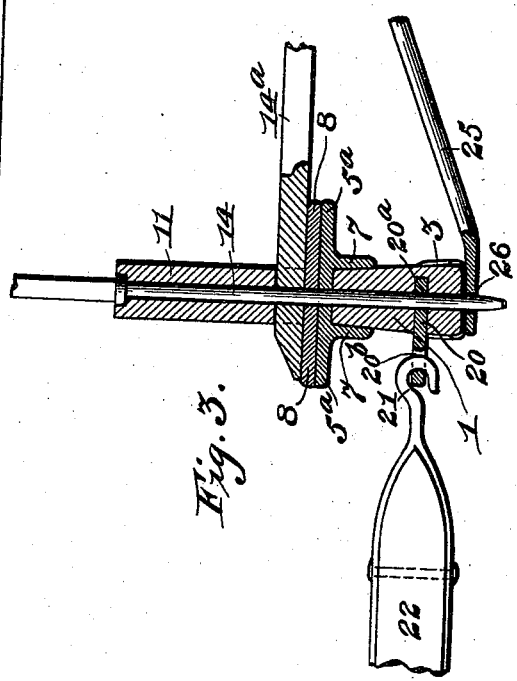
Figure 1:
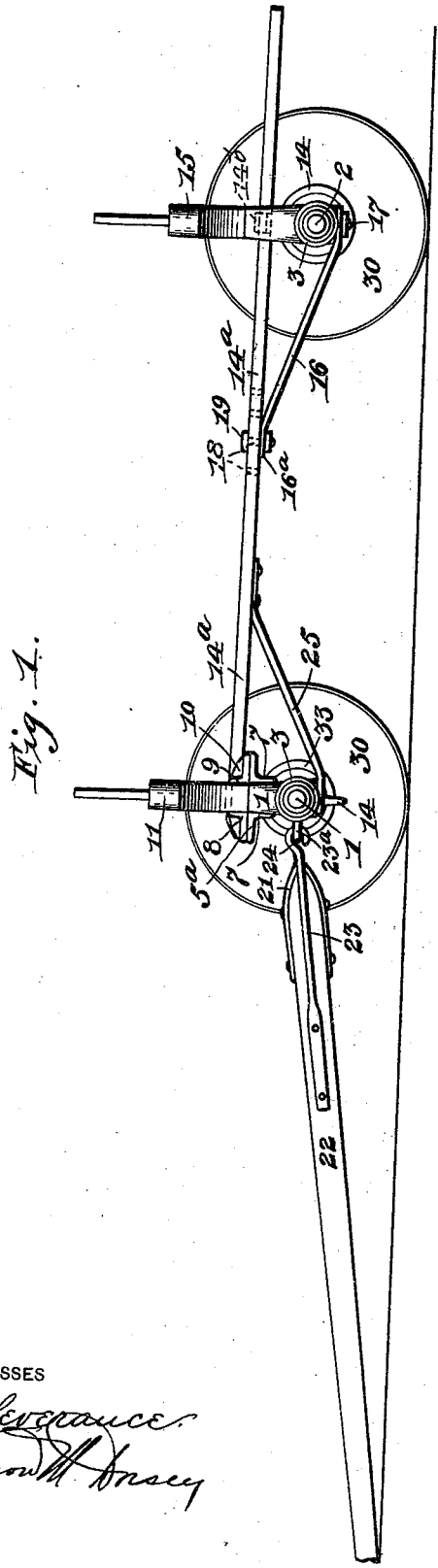
Figure 2:
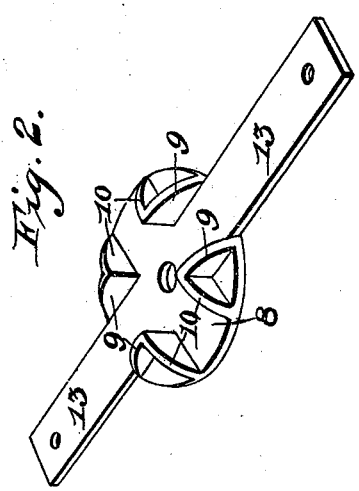

Referring to the accompanying drawings in which corresponding parts are designated by corresponding marks of reference: Figure 1 is a side view of a wagon constructed in accordance with my invention, the wheels thereof being removed for the purpose of better illustration thereof. Fig. 2 is a perspective detail view of the upper half of the fifth wheel. Fig. 3 is a partial longitudinal vertical section on the line X—X of Fig. 4, the front axle of the wagon and parts adjacent thereto being alone shown. Fig. 4 is a front view of a wagon constructed according to my invention. Fig. 5 is a rear elevation thereof. Fig. 6 is a diametrical section taken through a wheel constructed as shown in Fig. 5 and mounted on the axle.

The forward axle 1 and the rear axle 2 have secured on their ends the skeins 3, the skeins of the forward axle projecting sufficiently far toward the center thereof to permit the passage therethrough of bolts 4, which pass vertically through the forward axle, the upper end also passing through the ears 5, formed on the lower half $5^a$ of the fifth wheel, which has shoulders 7 upon its lower side at such a distance apart as to form a channel for the reception of the top of the forward axle. The upper half 8 of the fifth wheel has transverse and longitudinal shoulders 9 and 10, respectively thereon, forming transverse and longitudinal grooves, which cross each other at the centers thereof and at the center of the fifth wheel. The bolster 11 has the central portion of its lower part contained in the transverse groove thus formed, the upper half of the fifth wheel being secured to the bolster by means of bolts or screws 12, which pass through the ears 13 on the former and take into the thickness of the latter. The forward end of the reach is contained within the longitudinal groove thus formed on the upper half of the fifth wheel, passing entirely through the bolster and supported in front thereof and prevented from splitting by the shoulders 10 forming the front end of the said longitudinal groove, thus obviating the necessity of extensions on the fifth wheel to receive the said reach, and of bolts other than the king bolt, for securing it in place as have been used in previous constructions. The king-bolt 14 passes through the center of the bolster, through the reach, through the two halves of the fifth wheel, and through the rear axle. The rear end of the reach $14^a$ passes through the rear axle, or through a suitable clip $14^b$ secured on the said axle, and below the bolster 15, mounted thereon. Hounds 16, formed of a suitable metallic rod, are secured to the opposite ends of the rear axle, the attaching bolts or pins 17 therefor, passing through the rear axle and the bolster 15 thereon, while the central part of the rod has an eye $16^a$ formed therein, through which, and through any one of the series of perforations 18, formed in the rear end of the reach, a locking pin 19 is adapted to be inserted to prevent the separation of the front and rear axle.

A double eye piece 20 is inserted in the front of the forward axle, the rear eye $20^a$ therein being in alignment with the vertical hole or perforation in the axle through which the king bolt passes, whereby the said bolt will pass through the rear eye of the said piece, and the forward eye 20$^b$ thereof being adapted to receive the hook 21 on the rear end of the pole 22, the said pole also having rearwardly flared arms 23 secured thereto, which are provided with hooks 24 to engage eyes 23$^a$, cast on the skeins of the forward axle, which hooks open downwardly as does the hook 21 on the rear end of the pole, whereby the pole may be removed and disconnected from the forward axle by removing the king-bolt and turning the upper portion of the axle to the rear and also moving the pole to the rear until the hooks are disengaged from the eyes upon the axle, the hooks upon the flared arms serving as a means whereby the forward axle may be turned in drawing the wagon. It will be seen, however, that the strain upon the pole in drawing the wagon is directly transmitted to the king-bolt through the eye piece 20, thus transmitting it in turn to the reach, through the forward end of which the said bolt also passes, and relieving the forward axle of much of the strain that has heretofore been placed upon it.

The wheel 30 of the wagon, I by preference, turn out of a single piece of wood of a sufficient diameter, leaving a central boss 31 on each side thereof, through the center of which passes the central hole 32 to receive the axle-box 32$^a$. In order to strengthen a wheel so constructed I shrink on the outer ends of each of the bosses thereon, an iron collar 33, which also serves as an armor for the hub so formed, and as a sand band, while an iron tire 34 is shrunk around the periphery of the wheel. By this construction it will be seen that a wheel, the periphery of which is of any desired width may be constructed of any desired thickness at its center to receive a box of any length that may be desired, in order to form an efficient bearing for the wheel, the said construction also admitting the shrinking of the bands on the bosses on each side of the wheel so formed.

In order to prevent the strain of the coupling, which would otherwise come upon the upper end of the king bolt, from tending to turn over the forward axle, I secure a brace 25 to the lower side of the reach and projecting downwardly and forwardly therefrom to below the center of the axle, where it has an eye 26 which receives the lower end of the king bolt. It will be noticed that the king bolt passes through the eye piece midway between the points at which it passes through the reach and brace thereon, whereby the above described result is more perfectly obtained.

It will be obvious that a wagon constructed as hereinbefore described may be made of great strength, and that the axles may be made of great depth, and that the axles are not weakened by a great number of apertures therein, the only apertures provided being the vertical holes in the forward axle to receive the king-bolt, and the intersecting hole therein to receive the eye-piece 20, and the necessary apertures to receive the vertical securing bolts in both axles.

Having thus described my invention, what I claim, and desire to secure by Letters Patent of the United States, is—

1. In a wagon, the combination with the forward axle thereof, having a vertical hole therein to receive the king bolt; of a piece inserted in the said axle and projecting forwardly therefrom, the said piece having an eye in its rear end in alignment with the said vertical hole in the said axle, and having an eye in the projecting part thereof, and a pole, having a downwardly opening hook in its rear end adapted to engage the eye in the projecting end of the said piece, substantially as described.

2. In a wagon, the combination with the forward axle thereof, and with a bolster mounted thereon, the said bolster and axle having a vertical hole therein, of a fifth wheel consisting of two castings, one of the said castings being secured to the top of the said axle, and the opposite casting having longitudinal and transverse grooves formed in its upper surface, the said transverse groove receiving the base of the said bolster; a reach having its forward end contained in the longitudinal groove in the said fifth wheel and extending therein through and in front of the said bolster; and a king bolt contained in the vertical hole in the said axle and bolster and passing through the said fifth wheel and the said reach, substantially as described.

3. As a new and improved article in manufacture, the hereinbefore described one-half of a fifth wheel, consisting of a suitable casting, having shoulders upon its top, forming transverse and longitudinal grooves, which intersect each other at their centers and at the center of the said fifth wheel, which is apertured at the said center for the passage of a king bolt, substantially as described.

4. In a wagon, the combination with the forward axle thereof, and a bolster mounted on the said axle, the said bolster and axle having a vertical hole therein to receive a king bolt, of a piece inserted in the said axle and projecting forwardly therefrom, the said piece having an eye in its rear end, in alignment with the said vertical hole in the said axle; a fifth wheel consisting of two castings, one of the said castings being secured on the said axle, and the opposite casting having shoulders upon its top, forming transverse and longitudinal grooves, which intersect each other at their centers, and at the center of the said fifth wheel, which is apertured at the said center for the passage of the said king bolt, the said transverse groove receiving the said bolster, and a reach having its forward end inserted in the said longitudinal groove, and extending therein through and in front of the said bolster, substantially as described.

5. In a wagon, the combination with the front and rear axles, of bolsters mounted on the said axles, a reach, a fifth wheel, consisting of two castings, one of the said castings having shoulders upon its top forming transverse and longitudinal grooves, which intersect each other at their centers, and at the center of the said fifth wheel, the said transverse groove receiving the said bolster and the longitudinal groove receiving the forward end of the said reach, the opposite casting being secured on the upper surface of the forward axle, a kingbolt passing through the said bolster, axle, reach, and through the center of the said fifth wheel, and a metallic rod, having an eye formed in its center to lock the said reach, and bolts passing through the opposite ends and through the rear axles and bolster thereon, substantially as described.

6. In a wagon, the combination with the front and rear axles thereof; of bolsters and wheels mounted on the said axles, the former projecting over the latter, the forward axle and bolster having vertical aligned holes therein, of a piece inserted in the said forward axle, and projecting forwardly therefrom and having eyes in its opposite ends, the rear eye therein being in alignment with the said hole in the said axle; of skeins mounted on the ends of the said front axle and having eyes cast thereon; a pole having a downwardly opening hook on its rear end adapted to engage the forward eye on the said piece, and having rearwardly projecting flared arms secured on its sides and provided with downwardly opening hooks adapted to engage the eyes upon the said skeins, a fifth wheel consisting of two castings, one of the said castings having shoulders upon its top, forming transverse and longitudinal grooves, which intersect each other at their centers, and at the center of the said fifth wheel, the said transverse groove receiving the said forward bolster, the opposite casting being secured on the upper surface of the front axle, a king bolt passing through the said front axle, bolster mounted thereon, and through the center of the said fifth wheel, a metallic rod having an eye formed in its center, bolts passing through the opposite ends of the said rods and through the rear axle and bolster thereon, and a reach, having its forward end contained in the longitudinal groove in the said fifth wheel, and adapted to be secured to the said eye in the said rod, and having a downwardly projecting apertured brace thereon adapted to receive the lower end of the said king bolt, substantially as described.

In testimony whereof I affix my signature in presence of two witnesses.

CHARLES W. ROBINSON.

Witnesses:
J. B. LAWYER,
VERNON M. DORSEY.